United States Patent [19]

Kawamura

[11] Patent Number: 5,069,422
[45] Date of Patent: Dec. 3, 1991

[54] ELECTROMAGNETIC FORCE VALVE DRIVING APPARATUS

[75] Inventor: Hideo Kawamura, Samukawa, Japan

[73] Assignee: Isuzu Ceramics Research Institute Co., Ltd., Fujisawa, Japan

[21] Appl. No.: 500,194

[22] Filed: Mar. 27, 1990

[30] Foreign Application Priority Data

Mar. 30, 1989 [JP] Japan .................................. 1-80131

[51] Int. Cl.$^5$ ...................... F16K 31/06; F16K 31/08
[52] U.S. Cl. .................................. 251/129.1; 251/65; 251/368; 251/129.04; 123/90.11
[58] Field of Search ...................... 251/129.1, 65, 368, 251/129.04; 123/90.11

[56] References Cited

U.S. PATENT DOCUMENTS

| | | | |
|---|---|---|---|
| 4,254,935 | 3/1981 | Jarrett | 251/129.1 |
| 4,359,022 | 11/1982 | Nakamura et al. | 123/188 AA |
| 4,690,371 | 9/1987 | Bosley et al. | 251/65 |
| 4,883,025 | 11/1989 | Richeson | 251/65 X |

FOREIGN PATENT DOCUMENTS

| | | |
|---|---|---|
| 2614004 | 9/1976 | Fed. Rep. of Germany. |
| 0134089 | 8/1982 | Japan .................................. 251/65 |
| 60-109678 | 6/1985 | Japan. |

OTHER PUBLICATIONS

Partial English translation of Japanese Patent Publication 57-134089.

Primary Examiner—Arnold Rosenthal
Attorney, Agent, or Firm—Staas & Halsey

[57] ABSTRACT

A valve electromagnetic force driving apparatus opens the suction/exhaust valve of an engine by an electromagnetic force generated by an electromagnet. A freely reciprocatable movable permanent magnet having at least one pair of magnetic poles arrayed in the direction of reciprocation is connected to the suction/exhaust valve, and fixed magnetic poles opposing the magnetic poles of the movable permanent magnet are provided and similarly arrayed in the direction of reciprocation. The suction/exhaust valve is driven, to open and close the same, by electromagnetic attractive and repulsive forces acting between the magnetic poles of the movable permanent magnet and the fixed magnetic poles. A fixed electromagnet opposing a reciprocating side end face of the suction/exhaust valve is provided and is adapted to subject the valve to a force acting in the opening direction when the valve is opened and closed. The actual operating state of the suction/exhaust valve is sensed, and when the operating state differs from a control command, the suction/exhaust valve is forcibly closed and self-diagnosis is performed.

10 Claims, 3 Drawing Sheets

ELECTROMAGNETIC FORCE VALVE DRIVING APPARATUS

BACKGROUND OF THE INVENTION

1. Field of the Invention

This invention relates to an electromagnetic force valve driving apparatus for applying a strong driving force in an opening direction when a suction/exhaust valve driven open and closed by an electromagnetic force starts opening.

2. Description of the Prior Art

A conventional apparatus for driving a suction/exhaust valve to open and close the same includes a cam shaft disposed on the upper portion or side face of the engine. A crankshaft, which is the output shaft of the engine, and the cam shaft are connected by rotary transmission means such as a belt, and the cam shaft is driven rotatively in synchronism with the rotational phase of the engine. Owing to this rotative drive, the cam face of the cam shaft pushes the shaft end face of the suction/exhaust valve via a link mechanism such as a rocker arm or pushing rod. Accordingly, the suction/exhaust valve, which is held in the closed state at all times by a spring, is opened by pushing the shaft end face of the valve.

This conventional drive apparatus for opening and closing the suction/exhaust valve results in a large-size engine because the cam shaft and link mechanism must be added to the engine.

Furthermore, since the cam shaft and link mechanism are driven by the output shaft of the engine, some of the engine output is consumed by frictional resistance when the cam shaft and link mechanism are driven. This diminishes the effective output of the engine.

Further, the actuation timing of the suction/exhaust valve cannot be altered during engine operation. Therefore, the valve actuation timing is adjusted in such a manner that a high output will be attained when the engine is running at a prescribed rotational speed. As a result, engine output and efficiency decline when the engine is running at an rpm different from the prescribed rpm.

In order to solve the foregoing problems, an apparatus for driving a suction/exhaust valve by connecting a magnetic body to the shaft end portion of the suction/exhaust valve and attracting the magnetic body by a fixed electromagnet has been disclosed in Japanese Patent Application Laid-Open (KOKAI) Nos. 58-183805 and 61-76713.

Though a suction/exhaust valve can be driven open and driven closed by a small driving force when the valve is in the process of opening and closing, the valve must be driven against the internal pressure of the cylinder at the start of the opening operation, so that a large driving force acting in the opening direction is required at such time. In order to mitigate suction/exhaust valve seating shock at the end of the closing operation, the speed of the valve in the closing direction must be reduced sharply at such time. This makes necessary a large driving force acting in the opening direction just as when the valve opening operation starts.

However, with the disclosed electromagnet arrangement in the apparatus described in these two publications, the driving force cannot be intensified at the start of the opening operation and at the end of the closing operation. In order to generate the electromagnetic force required at these times, the apparatus for controlling the opening and closing operation would be unnecessarily large.

SUMMARY OF THE INVENTION

Accordingly, an object of the present invention is to provide an electromagnetic force valve driving apparatus capable of subjecting a suction/exhaust valve of an engine to a large driving force in the opening direction at the start of the opening operation and at the end of the closing operation with the minimum capacity necessary for driving the suction/exhaust valve open and closed, which apparatus is small in size and capable of executing reliable opening and closing control.

In accordance with the present invention, the foregoing object is attained by providing an electromagnetic force valve driving apparatus comprising a movable permanent magnetic connected to a suction/exhaust valve and having a pair of magnetic poles arranged in a direction in which the suction/exhaust valve is reciprocated, fixed magnetic poles opposing the magnetic poles of the movable permanent magnet and arranged to have a spacing different from a spacing between the magnetic poles of the movable permanent magnet, fixed excitation coils wound on respective ones of the fixed magnetic poles for exciting the fixed magnetic poles, energizing control means for controlling passage of current through the fixed excitation coils so that an electromagnetic force acts between the magnetic poles of the movable permanent magnet and the fixed magnetic poles, thereby driving the suction/exhaust valve to open and close the same, and an upper fixed electromagnet opposing a reciprocating side end face of the movable permanent magnet for subjecting the suction/exhaust valve to a force acting in an opening direction at start of an operation for opening the suction/exhaust valve.

Thus, in accordance with the electromagnetic force valve driving apparatus of the present invention, a large driving force acting in the opening direction is applied to the suction/exhaust valve when the valve opening operation starts and when the valve closing operation ends. The apparatus is small in size and capable of executing control of the opening/closing drive operation reliably at the beginning of the opening operation and at the end of the closing operation.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

An embodiment of the present invention will now be described in detail with reference to the drawings.

Figure 1:
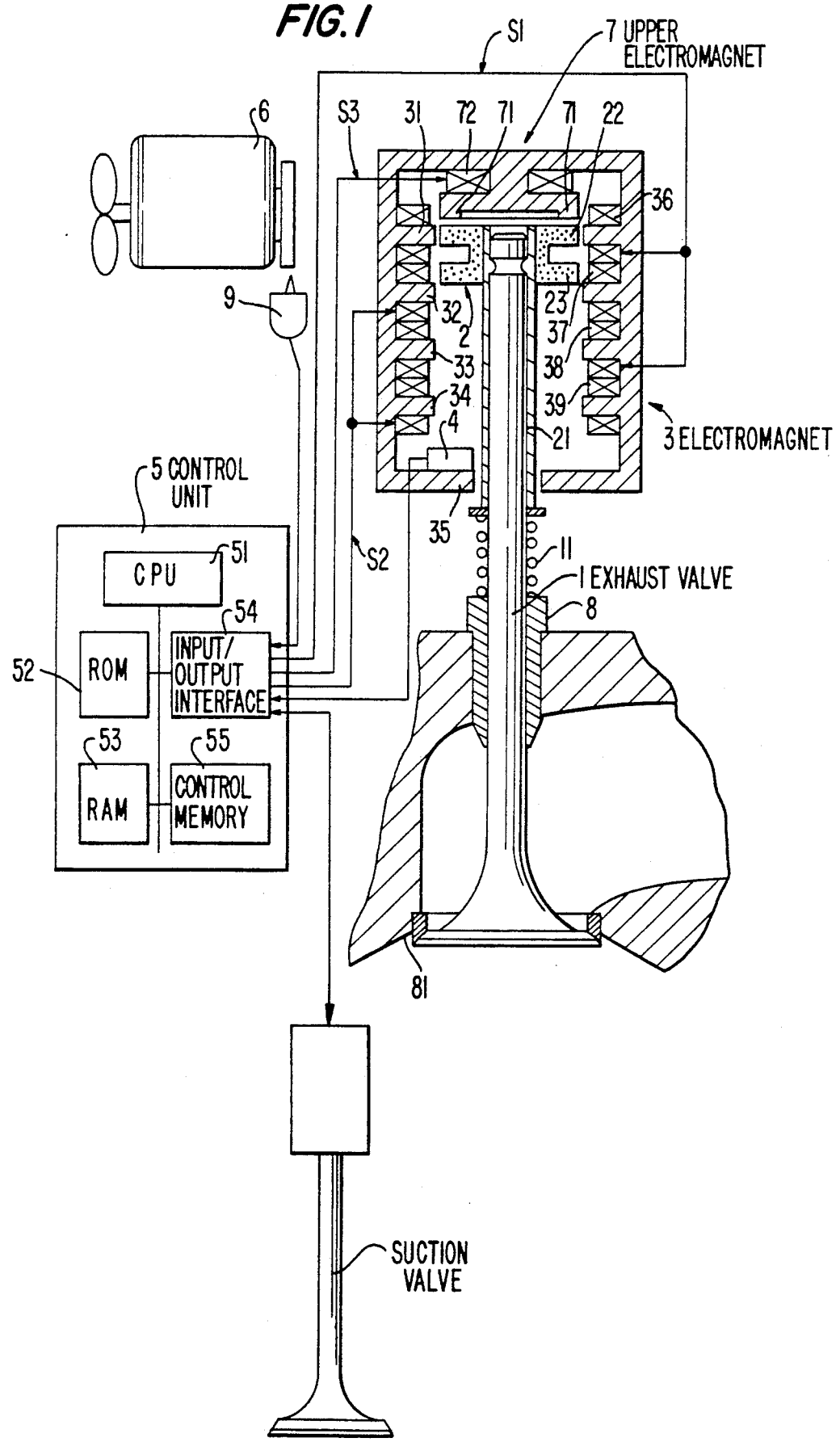
FIG. 1 is a block diagram illustrating a driving apparatus according to the present invention.

In FIG. 1, numeral 6 denotes an engine having an output shaft in the vicinity of which is disposed a rotation sensor 9 for sensing the rotational speed and rotational phase of the output shaft and converting sensed speed and phase into electric signals. Suction valves and exhaust valves for controlling the opening and closing of suction and exhaust ports are disposed within the engine 6. The drive apparatus of the present invention will be described hereinafter principally with regard to an exhaust valve.

Numeral 1 denotes an exhaust valve consisting of a high-strength, light-weight material such as a ceramic. The exhaust valve 1 has its shaft portion supported by a valve guide 8 so as to be freely movable in the axial direction.

A valve seat 81 is disposed at an exhaust port, which is the terminus of an exhaust conduit. A beveled portion of the exhaust valve 1 and the valve seat 81 are in intimate contact to close the exhaust port.

The shaft end portion of exhaust valve 1 is sheathed by a magnetic passageway 21 comprising a cylindrical magnetic body. A circular permanent magnet 2 is fitted onto the outer periphery of the magnetic passageway 21 on the shaft end side thereof. The permanent magnet 2 has magnetic poles disposed with a predetermined spacing P therebetween in the axial direction of the exhaust valve 1. The pole on the shaft end side is an N pole 22, and the other pole is an S pole 23.

An electromagnet 3 is disposed circumferentially of the exhaust valve 1 and comprises four projecting magnetic poles 31, 32, 33, 34, spaced apart by (3/2)P, opposing the magnetic poles of the movable permanent magnet 2 and arrayed in a row in the direction of movement of the permanent magnet 2, a fixed magnetic pole 35 opposing the outer peripheral surface of the magnetic passageway 21, and coils 36, 37, 38, 39 wound on the projecting magnetic poles 31, 32, 33, 34, respectively.

Among the coils 36, 37, 38 and 39, the coils 36, 38 are wound in mutually opposite directions, and so are the coils 37, 39. An upper electromagnet 7 is connected to the upper portion of the electromagnet 3. The upper electromagnet 7 comprises an upper magnetic pole 71 which opposes the side face of the N magnetic pole 22 across a small gap when the exhaust valve 1 is in the closed state, and an upper coil 72 wound on the upper magnetic pole 71.

A spring 11 is provided between the magnetic passageway 21 and valve guide 8 to prevent the exhaust valve 1 from dropping when the electromagnet 3 is not operating. A position sensor 4 is provided on the fixed magnetic pole 35 to sense the operating position of the exhaust valve 1 and output a position signal.

The output signals of the rotation sensor 9 and position sensor 4 enter a control unit 5 via an input/output interface 54. A signal for driving the exhaust valve 1 is outputted to the coils 36, 37, 38, 39 and the upper coil 72 via the input/output interface 54. A signal S1 is delivered to the coils 36, 38, a signal S2 is delivered to the coils 37, 39, and a signal S3 is delivered to the coil 72.

The control unit 5 includes, in addition to the input/output interface 54, a RAM 53 for temporarily storing data and the results of processing, a ROM 52 for storing programs and various maps, a CPU 51 for executing processing in accordance with programs stored in the ROM 52, and a control memory 55 for controlling the flow of signals within the control unit 5.

The operation of the invention will now be described with reference to FIG. 4.

Figure 4:
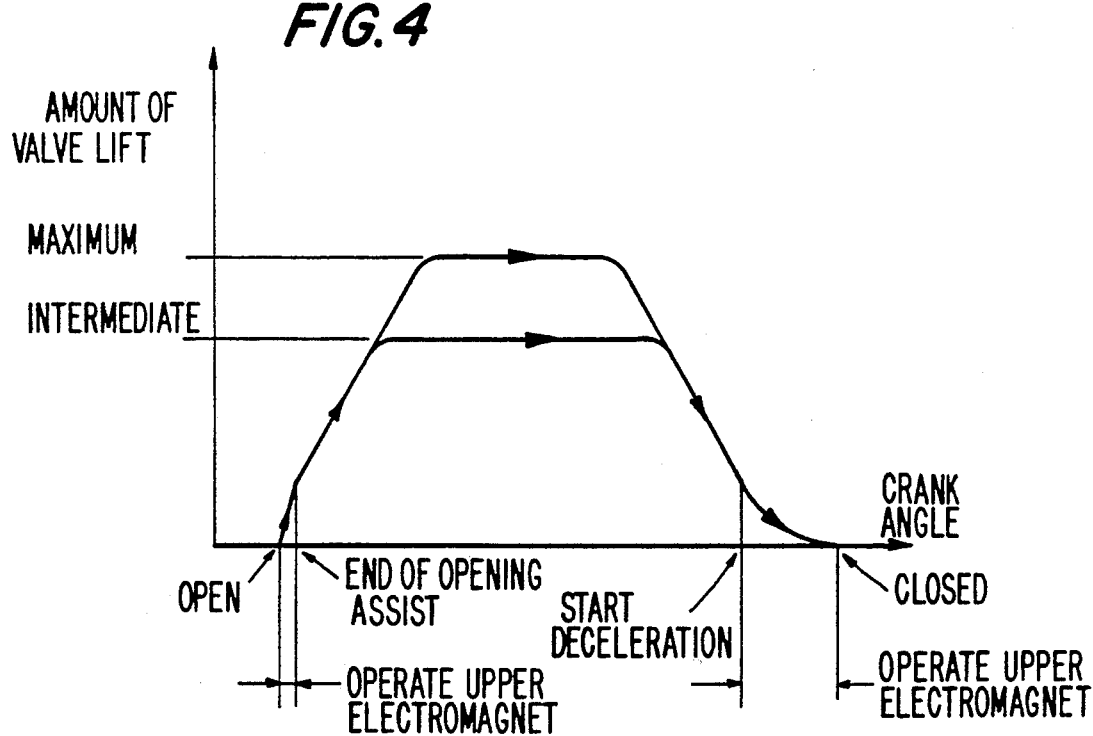
FIG. 4 is a diagram showing the relationship between crank angle and amount of valve lift.

FIG. 4 is a graph in which crank angle is plotted along the horizontal axis and the amount of valve lift is plotted along the vertical axis. The graph shows the amount of valve lift at maximum lift and intermediate lift.

When the crank angle of the engine 6 sensed by the rotation sensor 9 represents the timing for opening the exhaust valve 1, the control unit 5 computes the open/close speed and the amount of valve lift of the exhaust valve 1, based on the maps stored in the ROM 52, from a signal indicative of the rotational speed of the engine 6 and a signal (not shown) indicative of the amount of accelerator pedal depression. The control unit 5 outputs the signals S1, S2 based on the results of this processing, and outputs the signal S3. In response to the signal S3, the upper coil 72 causes an N pole to be produced in the upper magnetic pole 71.

As a result of the foregoing, a repulsive force acts between the upper magnetic pole 71 and the opposing N pole 22. Owing to this repulsive force, the exhaust valve 1 is driven in the opening direction against the pressure within the combustion chamber, thereby opening the exhaust port so that the exhaust in the combustion chamber is discharged from the opening. Accordingly, the pressure within the combustion chamber drops rapidly so that the exhaust valve 1 can be driven by a small driving force.

When the position of the exhaust valve 1 sensed by the position sensor 4 is greater than a predetermined position, the driving force produced by the upper electromagnet 7 is no longer necessary, and therefore the signal S3 is terminated.

Following termination of the signal S3, the exhaust valve 1 is driven in the opening direction by the signals S1 and S2. After being held at the position of the calculated amount of valve lift, the exhaust valve 1 is driven in the closing direction to close the exhaust port.

When it is sensed by the position sensor 4 also at the end of the closing operation that the exhaust valve 1 has been driven to the predetermined position, the signal S3 is outputted again to apply the electromagnetic force to the exhaust valve 1, thereby reducing the speed at which the valve moves in the closing direction. Owing to such deceleration, the exhaust valve 1 is seated gently on the valve seat 81, after which the signal S3 is terminated. The closed state is maintained by the signals S1, S2 until the next timing instant at which the valve is to be opened.

When the suction valve 1 is in the driven state, the position corresponding to the states of the signals S1, S2 and the position signal from the position sensor 4 are compared. If there is a disparity between the position corresponding to the states of signals S1, S2 and the actual position, the valve is returned to the closed state by a predetermined operation and fault diagnosis is performed.

The principle of the driving operation for opening and closing the exhaust valve 1 will now be described with reference to FIG. 2.

FIGS. 2(a)–(e) represent the right side of the drive apparatus of the exhaust valve 1 on a step-by-step basis.

Since the coils 36, 38 are wound in opposite directions as are the coils 37, 39, the projecting magnetic poles 31, 33 have polarities that differ from each other at all times, and so do the projecting magnetic poles 32, 34.

Since the gap between the fixed magnetic pole 35 and the magnetic passageway 21 is very small and is not changed even by movement of the exhaust valve 1, the magnetic resistance between the electromagnet 3 and the permanent magnet 2 is small so that the attractive and repulsive forces between the electromagnet 3 and permanent magnet 2 are large. As a result, the driving force that acts upon the exhaust valve 1 is increased.

Figure 2A:
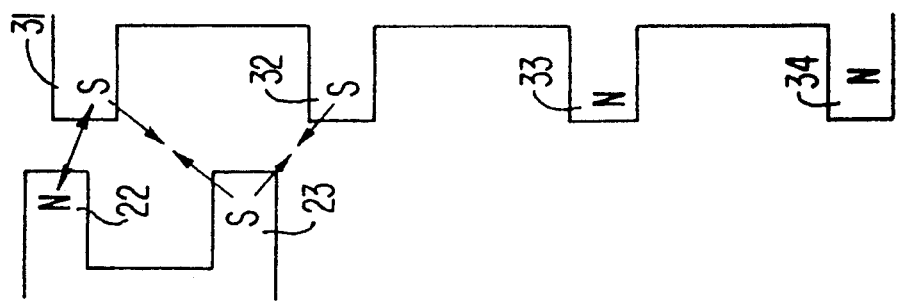
FIGS. 2(a)-2(e) are diagrams showing the principles of exhaust valve drive.
Figure 2B:
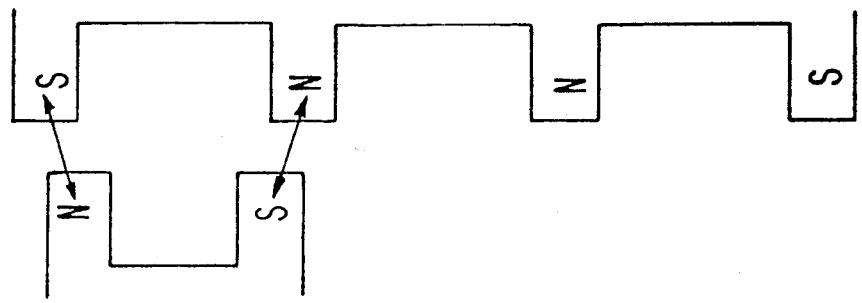
Figure 2C:
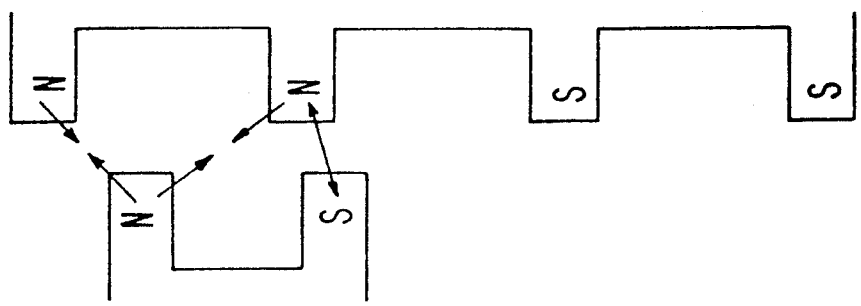
Figure 2D:
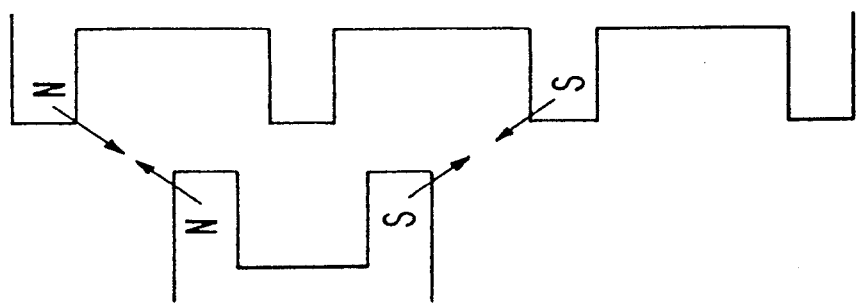
Figure 2E:
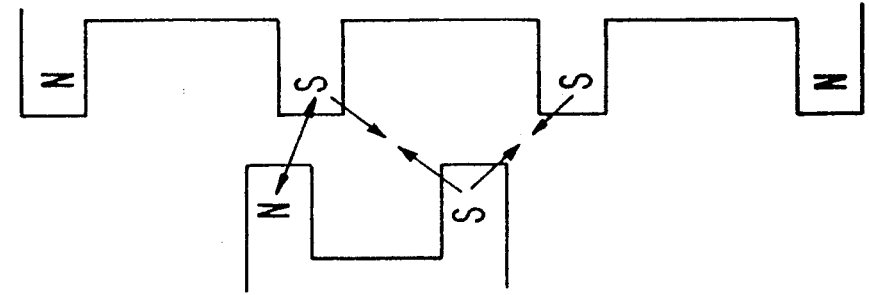

It should be noted that the description and operation of the upper electromagnet 7, as well as the description of coils 36, 37, 38, 39, are deleted. FIG. 2(a) shows the exhaust valve 1 in the seated position.

In response to the signals S1, S2, S poles are produced at the projecting magnetic poles 31, 32. As a result, the exhaust valve 1 is maintained at a position where balance is established between an attractive force, which acts between the N pole 22 of the permanent magnet 2 and the projecting magnetic pole 31, and a repulsive force acting between the S pole 23 of the permanent magnet 2 and the projecting magnetic poles 31, 32.

Next, the direction of current flow of signal S2 is reversed to change the polarity of the projecting magnetic pole 32 to an N pole. When this is done, the repulsive force between the S pole 23 and the projecting magnetic pole 32 changes to an attractive force, so that the exhaust valve 1 moves to the position shown in (b) of FIG. 2.

Next, the direction of current flow of signal S1 is reversed to change the polarity of the projecting magnetic pole 31 to an N pole, whereupon the attractive force between the N pole 22 and the projecting magnetic pole 31 changes to a repulsive force, so that the exhaust valve 1 moves to the position shown in (c) of FIG. 2.

Next, the signal S2 is temporarily stopped and then reversed in direction, so that the exhaust valve 1 moves to the position shown in (e) of FIG. 2 upon traversing the position shown in (d) of FIG. 2.

As shown in FIG. 2, the exhaust valve 1 moves by (3/8)P in each of the steps of (a) through (e). Accordingly, the traveling distance of the exhaust valve 1 can be controlled by the number of steps.

Figure 3:
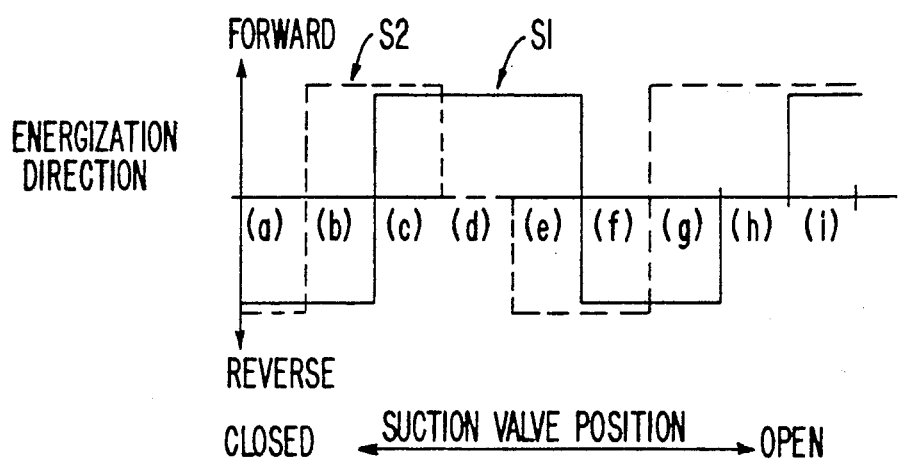
FIG. 3 is a diagram showing the energization states of signals S1 and S2.

The states of signals S1 and S2 are shown in FIG. 3 along with the states of FIGS. 2(a)-(e) mentioned above.

In FIG. 3, the position of the exhaust valve 1 is plotted along the horizontal axis, with the rightward direction corresponding to valve opening and the leftward direction corresponding to valve closure. The vertical axis represents the energization direction of the signals S1, S2. The energization direction for producing N poles in the projecting magnetic poles 31, 32 is taken as the positive direction. The solid line in FIG. 3 indicates the signal S1 and the dashed line the signal S2. Further, (a) through (e) indicate the energization states corresponding to (a) through (e) in FIG. 2, and (f) through (i) indicate the energization states which follow (a) through (e).

The energization direction is the reverse direction for both of signals S1 and S2 at (a) in FIG. 3, signal S2 changes to the forward direction and makes a transition to the state (b). Next, when signal S1 is changed to the forward direction, the state (c) is established. Then, when signal S2 is stopped, a transition is made to the state (d).

When the signal S2 is again passed in the reverse direction, state (e) is attained. When signal S1 also is changed to the reverse direction, state (f) is attained. In state (f) and state (a), the energization directions of signals S1 and S2 are the same but the position of the exhaust valve 1 will have moved by a distance of (15/8)P.

Similarly, when signal S2 is changed to the forward direction, the state (g) is established. Then, when signal S1 is stopped, the state (h) is obtained. State (i) is established by adopting the forward direction for both signals S1 and S2.

When the energization states of signals S1 and S2 are successively changed in the (a)→(i) direction, the exhaust valve 1 moves in the opening direction. When the change is made in the (i)→(a) direction, the exhaust valve 1 moves in the closing direction.

Though the present invention has been described primarily with regard to an exhaust valve in the foregoing embodiment, it is obvious that the drive apparatus according to the invention can be similarly applied to a suction valve.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for driving a suction/exhaust valve of an engine by an electromagnetic force in opening and closing directions, comprising:

at least one movable permanent magnet connected to the suction/exhaust valve and having a pair of magnetic poles arranged with a predetermined spacing in a direction in which the suction/exhaust valve is driven and including an end face of a side of said movable permanent magnet;

a plurality of fixed magnetic poles disposed to oppose the magnetic poles of said movable permanent magnet and arranged with a different spacing therebetween then the predetermined spacing;

a plurality of fixed excitation coils wound on respective ones of said fixed magnetic poles so that the fixed magnetic poles can be excited;

energizing control means for controlling passage of current through said fixed excitation coils so that an electromagnetic force can act between the magnetic poles of said movable permanent magnet and said fixed magnetic poles, thereby driving the suction/exhaust valve in one of the opening and closing directions; and an upper fixed electromagnet disposed to oppose the end face of said movable permanent magnet so that said suction/exhaust valve, can be subjected to a first force acting in the opening direction when an operation for opening said suction/exhaust valve begins.

2. The apparatus according to claim 4, wherein said energizing control means comprises means for controlling passage of current through said upper fixed electromagnet to provide the first force acting in the opening direction when an operation for opening said suction/exhaust valve begins to provide a second force, larger than the first force, acting in the opening direction when an operation for closing the suction/exhaust valve ends.

3. The apparatus according to claim 4, wherein said energizing control means comprises means for controlling the passage of current through said fixed excitation coils so that said movable permanent magnet is capable of being stopped at a predetermined plurality of stopping positions.

4. The apparatus according to claim 1, wherein one movable permanent magnet is connected to the suction/exhaust valve.

5. The apparatus according to claim 1, wherein said fixed magnet poles are arranged in several rows.

6. The apparatus according to claim 4,
wherein said apparatus further comprises valve position sensing means for sensing a travelling velocity and an operating position of the suction/exhaust valve, and
wherein said energizing control means comprises means for receiving the traveling velocity and the operating position from said valve position sensing means and for executing control to vary the travelling velocity and the operating position of the suction/exhaust valve.

7. The apparatus according to claim 4, wherein said suction/exhaust valve comprises a ceramic material.

8. The apparatus according to claim 4, wherein said fixed magnetic poles are arranged in several rows.

9. The apparatus according to claim 4, wherein at least two of said fixed excitation coils are electrically isolated from one another.

10. The apparatus according to claim 9, wherein said energizing control means comprises means for independently controlling at least two of said fixed excitation coils.

* * * * *

UNITED STATES PATENT AND TRADEMARK OFFICE
CERTIFICATE OF CORRECTION

PATENT NO. : 5,069,422

DATED : December 3, 1991

INVENTOR(S) : Hideo Kawamura

It is certified that error appears in the above-identified patent and that said Letters Patent is hereby corrected as shown below:

Col. 1,    line 12, "Prior" should be --Related--.

Col. 2,    line 17, "magnetic" should be --magnet--.

Col. 6,    line 34, "then" should be --than--.

Signed and Sealed this

Twentieth Day of April, 1993

Attest:

MICHAEL K. KIRK

Attesting Officer    Acting Commissioner of Patents and Trademarks